(12) United States Patent
Thurber et al.

(10) Patent No.: US 9,379,645 B2
(45) Date of Patent: Jun. 28, 2016

(54) ACOUSTIC TURBINE

(71) Applicant: SONIC DYNAMICS, LLC, Elmhurst, IL (US)

(72) Inventors: James K. Thurber, Elmhurst, IL (US); Jonathan L. Thurber, Elmhurst, IL (US)

(73) Assignee: SONIC DYNAMICS, LLC, Elmhurst, IL (US)

(*) Notice: Subject to any disclaimer, the term of this patent is extended or adjusted under 35 U.S.C. 154(b) by 515 days.

(21) Appl. No.: 13/946,779

(22) Filed: Jul. 19, 2013

(65) Prior Publication Data

US 2014/0028150 A1  Jan. 30, 2014

Related U.S. Application Data

(63) Continuation of application No. 12/867,736, filed as application No. PCT/US2009/034313 on Feb. 17, 2009, now Pat. No. 8,492,956.

(60) Provisional application No. 61/028,974, filed on Feb. 15, 2008.

(51) Int. Cl.
| | |
|---|---|
| H01L 41/00 | (2013.01) |
| H02K 7/18 | (2006.01) |
| F03G 7/08 | (2006.01) |
| H02N 11/00 | (2006.01) |
| B08B 7/02 | (2006.01) |
| F03G 7/00 | (2006.01) |
| F03H 99/00 | (2009.01) |

(52) U.S. Cl.
CPC .............. *H02N 11/006* (2013.01); *B08B 7/02* (2013.01); *F03G 7/002* (2013.01); *F03H 99/00* (2013.01); *H02K 7/1823* (2013.01)

(58) Field of Classification Search
CPC ........ F03G 7/08; H02K 35/02; H02K 7/1853; F02B 63/04; F02B 71/04
USPC ................... 310/311, 328; 290/1 R
See application file for complete search history.

(56) References Cited

U.S. PATENT DOCUMENTS

| | | | | |
|---|---|---|---|---|
| 4,447,251 A | * | 5/1984 | Dunn | B01J 19/10 137/838 |
| 4,777,823 A | * | 10/1988 | Barmatz | G10K 15/00 181/0.5 |
| 4,962,330 A | * | 10/1990 | Lierke | B06B 3/00 181/0.5 |
| 2006/0082158 A1 | * | 4/2006 | Schrader | F03G 3/08 290/1 R |

* cited by examiner

*Primary Examiner* — Thomas Dougherty
(74) *Attorney, Agent, or Firm* — Marshall, Gerstein & Borun LLP

(57) ABSTRACT

A method and apparatus generates kinetic and electrical energy using sound waves and is believed to be particularly useful in high efficiency motors and electrical generators. In particular, the method and apparatus uses sound waves as a catalyst to convert ambient heat energy into kinetic and/or electrical energy. In one embodiment, sound waves at particular frequencies are propagated across one side of a plate or other barrier element, causing flow of fluid (e.g. air) across the surface of the plate which, in turn, causes a reduction in the ambient fluid (air) pressure near the surface of the plate. The difference in fluid pressure on opposite sides of the plate results in net positive thrust on the plate, thereby causing movement of the plate. This movement can be harnessed using, for example, a windmill type of rotor and stator arrangement to generate useful kinetic and electrical energy.

5 Claims, 5 Drawing Sheets

ACOUSTIC TURBINE

CROSS-REFERENCE TO RELATED APPLICATION

This application is a continuation of U.S. application Ser. No. 12/867,736 filed Feb. 16, 2011, entitled "Acoustic Turbine," which is a U.S. National Phase of PCT/US2009/034313 filed Feb. 17, 2009, which claims priority to and the benefit of the filing date of U.S. Provisional Patent Application No. 61/028,974, entitled "Acoustic Production of Kinetic and Electrical Energy," which was filed on Feb. 15, 2008, the entire disclosures of which are hereby incorporated by reference herein.

TECHNICAL FIELD

This application is generally related to the conversion of energy into useful work, and more specifically is related to a method and apparatus for converting heat energy into useful kinetic and electrical energy using acoustic energy.

BACKGROUND OF THE RELATED ART

Sound fields have been used to levitate objects by taking advantage of the Boltzmann-Ehrenfest principle of adiabatic invariance, which relates the acoustic potential acting on an object positioned in a single-mode cavity to a shift in resonant frequency caused by the presence of the object. In Putterman et al., "Acoustic Levitation and the Boltzmann-Ehrenfest Principle," J. Acoust. Soc. Am. 85(1), (1989), the torque imposed on the object in a single mode chamber by acoustic energy equals the angular derivative of the experimentally determined frequency shift ($\Delta\omega$). However, the levitation technique disclosed in this article is limited to high frequency sound waves used in single-mode cavities. Further, the created acoustic torque will only align with the cylindrical object being levitated in a horizontal plane, or when $\theta=90°$. These constraints, i.e., high frequency acoustic energy, the single mode cavity and the middle horizontal plane, severely limit the applications of the disclosed levitation technique.

In an earlier work, Allen et al., "A Powerful High Frequency Siren," J. Acoust Soc. Am. 19(5), (1947), a high frequency siren is used to generate chamber pressures of about two atmospheres and an output energy of approximately two kilowatts which can be used for heating purposes. However, this high frequency siren finds little use in most environments where such a sound output would be unacceptable or dangerous.

To date, acoustic or sound energy has not been used effectively to impart thrust or force on an object for purposes of providing useful work. While limited examples of levitation are known, the requirement that the object being levitated be disposed in an enclosed chamber renders the technique largely inapplicable. Further, the use of powerful sirens for generating heat is also largely industrially inapplicable and potentially harmful to workers.

SUMMARY OF THE DISCLOSURE

A method and apparatus that generate kinetic and electrical energy using sound waves is believed to be particularly useful in high efficiency motors and electrical generators. Stated simply, the method and apparatus described herein use sound waves as a catalyst to convert ambient heat energy into kinetic and/or electrical energy.

In one embodiment, sound waves at particular frequencies are propagated across one side of a plate or other barrier element, causing flow of fluid (e.g. air) across the surface of the plate which, in turn, causes a reduction in the ambient fluid (air) pressure near the surface of the plate. The difference in fluid pressure on opposite sides of the plate results in net positive thrust on the plate, thereby causing movement of the plate. This movement can be harnessed using, for example, a windmill type of rotor and stator arrangement to generate useful kinetic and electrical energy.

In another embodiment, a sonic thrust apparatus includes a barrier element including a first outer surface and a second outer surface. The sonic thrust apparatus further includes an acoustic oscillator disposed in close proximity to the first outer surface of the barrier element. The sonic thrust apparatus further includes a drive mechanism driving the acoustic oscillator to produce sound waves flowing along the first outer surface to create a pressure differential between the first outer surface and the second outer surface and to create a thrust on the second outer surface towards the first outer surface.

In yet another embodiment an acoustic turbine includes a rotor having an axis of rotation and at least one lever arm coupled to the rotor and extending way from the rotor. The lever arm includes a thrust element disposed on the lever arm. The thrust element may include a barrier element including a first outer surface and a second outer surface, and may further include an acoustic oscillator disposed in close proximity to the first outer surface of the barrier element. The thrust element may also include a drive mechanism for driving the acoustic oscillator to produce sound waves flowing along the first outer surface to create a pressure differential between the first outer surface and the second outer surface and to create a thrust on the second outer surface towards the first outer surface to rotate the rotor.

The operating principle of this system is analogous to the forces that result in lift on an airplane wing, in which faster air flow over the top of the wing, as compared to slower air flow over the bottom of the wing, causes a pressure difference on the opposite sides of the wing which, in turn, causes lift. Consistent with Bernoulli's law (which predicts the lift of an airplane wing), a sonic oscillator, properly configured, produces sound waves that result in a pressure drop on one side of the plate or other barrier element as compared to the opposite side of the plate or barrier element. This pressure difference results in enough thrust to turn a mechanical gear or other rotating mechanism. This system and method can therefore be used as part of a motor to produce rotation, or as part of a generator to generate electrical energy.

The kinetic and electrical energy generated by this system and method is ultimately derived from the heat energy in the ambient fluid (air), as predicted by the ideal gas law, and preliminary research predicts that this energy conversion can be performed with surprisingly high efficiency.

DETAILED DESCRIPTION

Generally speaking, sound can be used as a catalyst for obtaining torque on a barrier element, such as a flat plate, which thereby causes motion of the plate. When connected to proper mechanical structures, such as a lever arm connected to a rotatable axis, the motion of the plate can be converted into useful kinetic energy to drive a rotating wheel, gear, bar or other element. This motion can also be converted into electrical energy using an electrical rotor and stator configuration as is common in well known generator technology.

In a simple form, an acoustic oscillator is used to generate and direct sound waves across the surface of a barrier element in the form of a flat plate. The sound waves, when properly generated, form a low pressure region immediately adjacent to the surface of the flat plate at which the acoustic oscillator is located. Ambient fluid pressure on the other side of the plate results in thrust on the plate, which propels the plate toward the low pressure region, and this thrust can be harnessed to produce useful kinetic and electrical energy.

Figure 1:
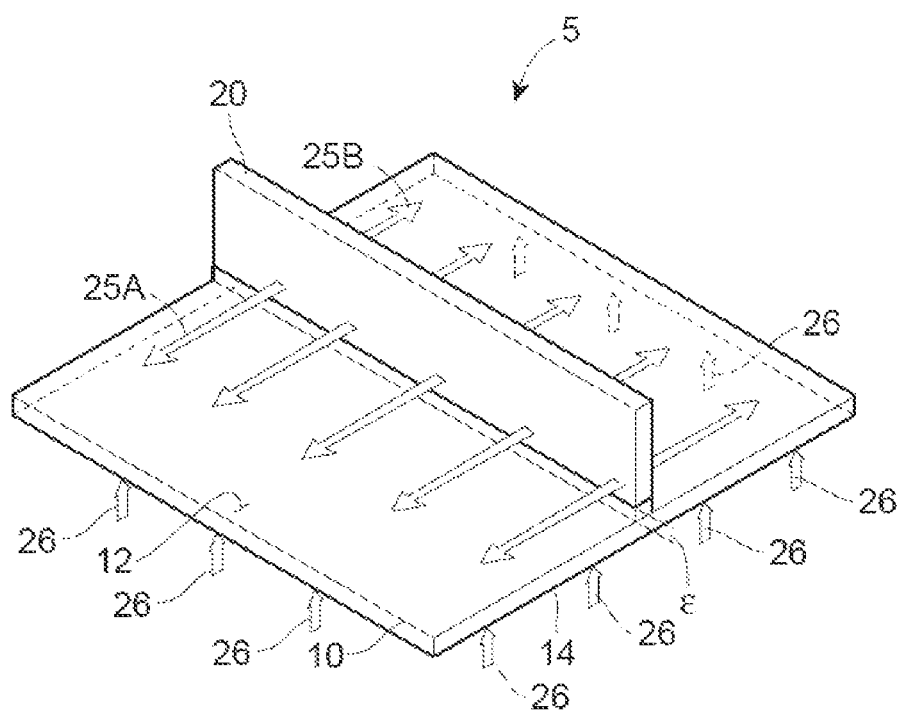
FIG. 1 is a perspective view of a sonic thrust element which uses sonic energy to produce thrust on a barrier element in the form of a flat plate.

FIG. 1 illustrates an example of a sonic thrust element 5 including a flat plate 10 having an upper surface 12 and a lower surface 14, and an acoustic oscillator 20 disposed in close proximity to the upper surface 12 of the flat plate 10. In particular, the acoustic oscillator 20 is illustrated as a square oscillator disposed slightly above, and in the middle of the upper surface of the flat plate 10. In this case, the oscillator 20 is disposed a finite distance $\epsilon$ above the upper surface 12 of the flat plate 10 and is positioned so as to produce sound waves that flow across the upper surface 12 of the flat plate 10 in a direction generally perpendicular to the normal of the flat plate 10. The arrows 25A and 25B indicate the direction of sound propagation in the system of FIG. 1.

During operation, electrical or other energy (such as mechanical energy) is provided to drive the acoustic oscillator 20 (via electrical wires or other mechanical mechanism not shown in FIG. 1) so that the acoustic oscillator 20 produces sound waves, having a constant or near constant frequency as described in more detail below. These sound waves propagate across the upper surface 12 of the flat plate 10 on either sides of the oscillator 20, as illustrated by the arrows 25A and 25B. If produced in accordance with the techniques and constraints defined herein, the sound waves produced by the oscillator 20 create a low pressure region immediately adjacent to the upper surface 12 of the flat plate 10. As the sound waves produced by the oscillator 20 do not affect the fluid pressure immediately adjacent the flat plate 10 on the lower surface 14 of the flat plate 10, a pressure differential is created on the opposite sides 12 and 14 of the flat plate 10. This pressure differential results in a thrust (denoted by arrows 26) on the lower surface 14 of the flat plate 10, across the entire surface 14 of the flat plate 10, and generally in the direction of the upper surface 12 of the flat plate 10.

Figure 2A:
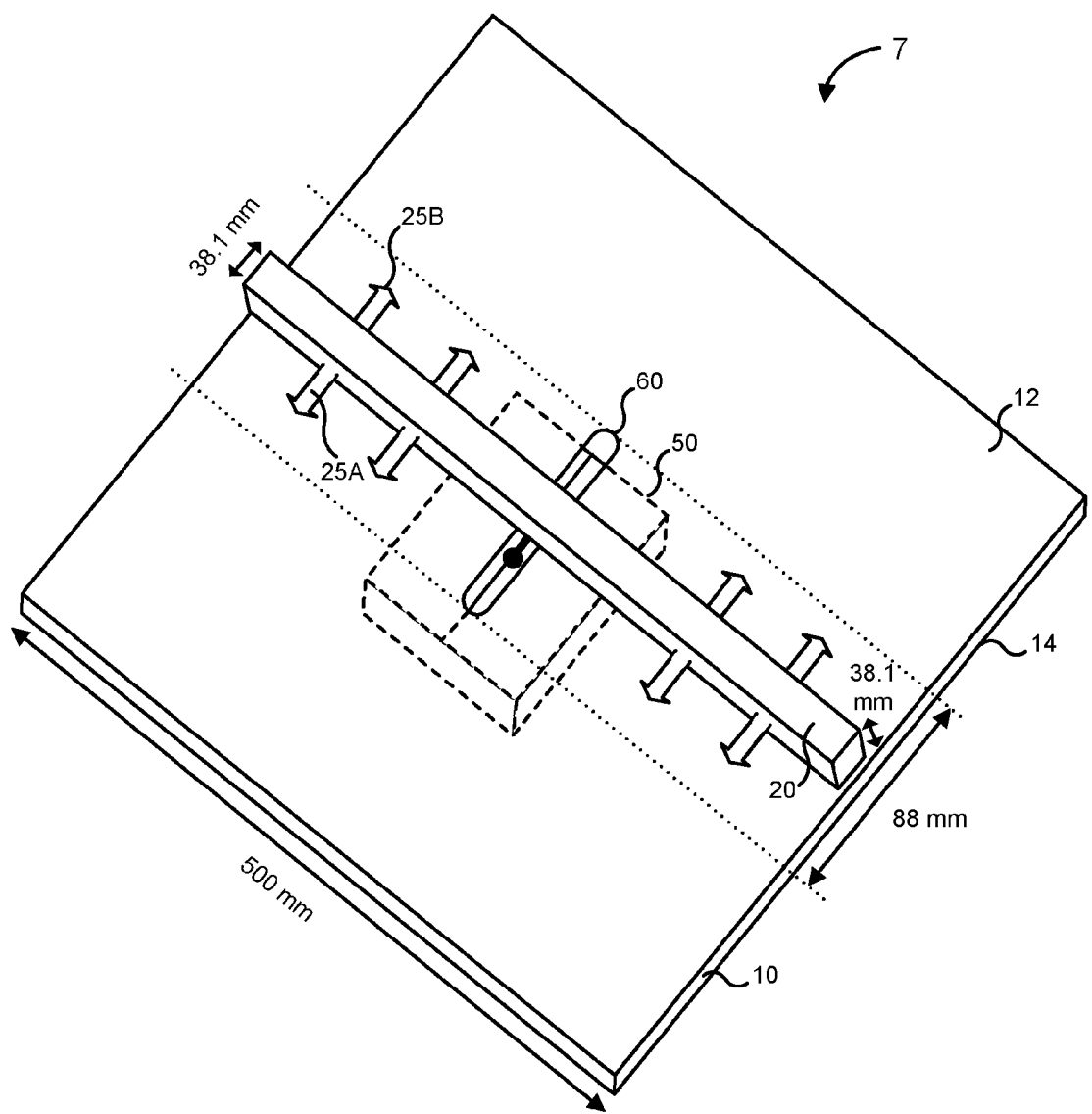
FIG. 2A is a perspective view of a sonic thrust element that includes a motor system for oscillating the acoustic oscillator in FIG. 1.
Figure 2B:
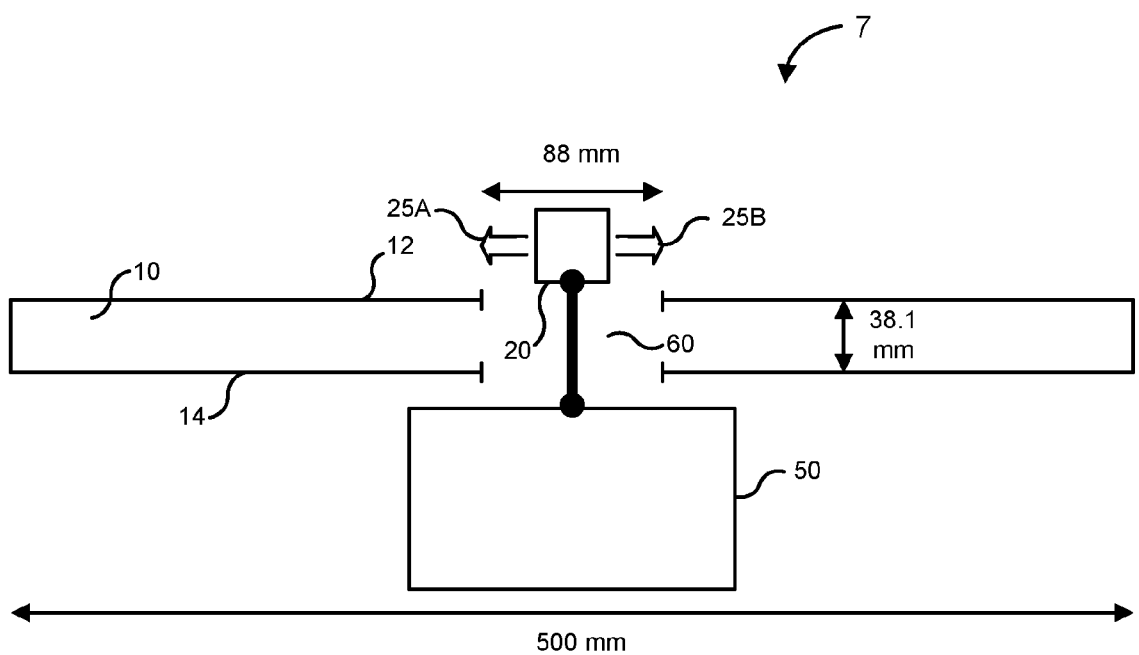
FIG. 2B is a cross-sectional view of the sonic thrust element in FIG. 2A.

FIGS. 2A-2B illustrate another example of a sonic thrust element 7 including a flat plate 10 having an upper surface 12 and a lower surface 14, and an acoustic oscillator 20 disposed in close proximity to the upper surface 12 of the flat plate 10. In this case, the flat plate 10 includes an aperture 60 (e.g., a hole, or a slit), and the oscillator 20 is coupled to a motor system 50 via the aperture 60. The motor system 50 linearly oscillates (drives) the oscillator back and forth along the plane of the upper surface 12 so that the acoustic oscillator 20 produces sound waves, having a constant frequency as described in more detail below. As explained in reference to FIG. 1, these sound waves propagate across the upper surface 12 of the flat plate 10 and create a pressure differential on the opposite sides 12 and 14 of the flat plate 10 that results in a thrust on the lower surface 14 of the flat plate 10, and generally in the direction of the upper surface 12 of the flat plate 10 (i.e., in the direction normal to the surface plane of the flat plate 10).

The motor system 50 may be implemented in a number of ways. For example, a rotational motor may be used (not shown). The rotational motor may be coupled to a linkage, a cam, etc., to transform the rotational motion of the rotational motor into a linear motion along the upper surface 12 of the flat plate 10. In some embodiments, the rotational motion and/or the resulting linear motion have an associated frequency of 450 Hz.

The motor system 50 may be coupled to the acoustic oscillator 20 in any of a variety of manners (e.g., via bolts, nuts, pins, cams, linkage arms, and so on). In some embodiments, the motor system 50 may be easily detachable from the acoustic oscillator 20 so that different motor systems may be used. Moreover, the motor system 50 may take the form of, or may be powered by mechanical motion collected from other sources, such as sources of waste heat or waste energy.

In different embodiments, the different building blocks of the sonic thrust element 7 may be of different shapes and sizes and may be made from a variety of materials. For example, the flat plate 10 may be a square plate, 500 mm on each side. The acoustic oscillator 20 may have a width of 500 mm, and a height and length of 38.1 mm. The aperture in the flat plate 10 may be 88 mm thereby allowing the oscillator 20 to oscillate 88 mm along the flat plate 10. Both the flat plate 10 and the oscillator 20 may be may be made of aluminum. However, the flat plate 10 and/or the oscillator 20 may be made of other suitable materials, such as carbon fiber, fiberglass, etc. Of course, these materials, and system dimensions are associated with one particular embodiment of the invention, and other sets of dimensions and materials will operate according to the principles described herein. Thus, the invention is not limited to the particular dimensions and materials described herein with respect to FIG. 2.

Figure 3:
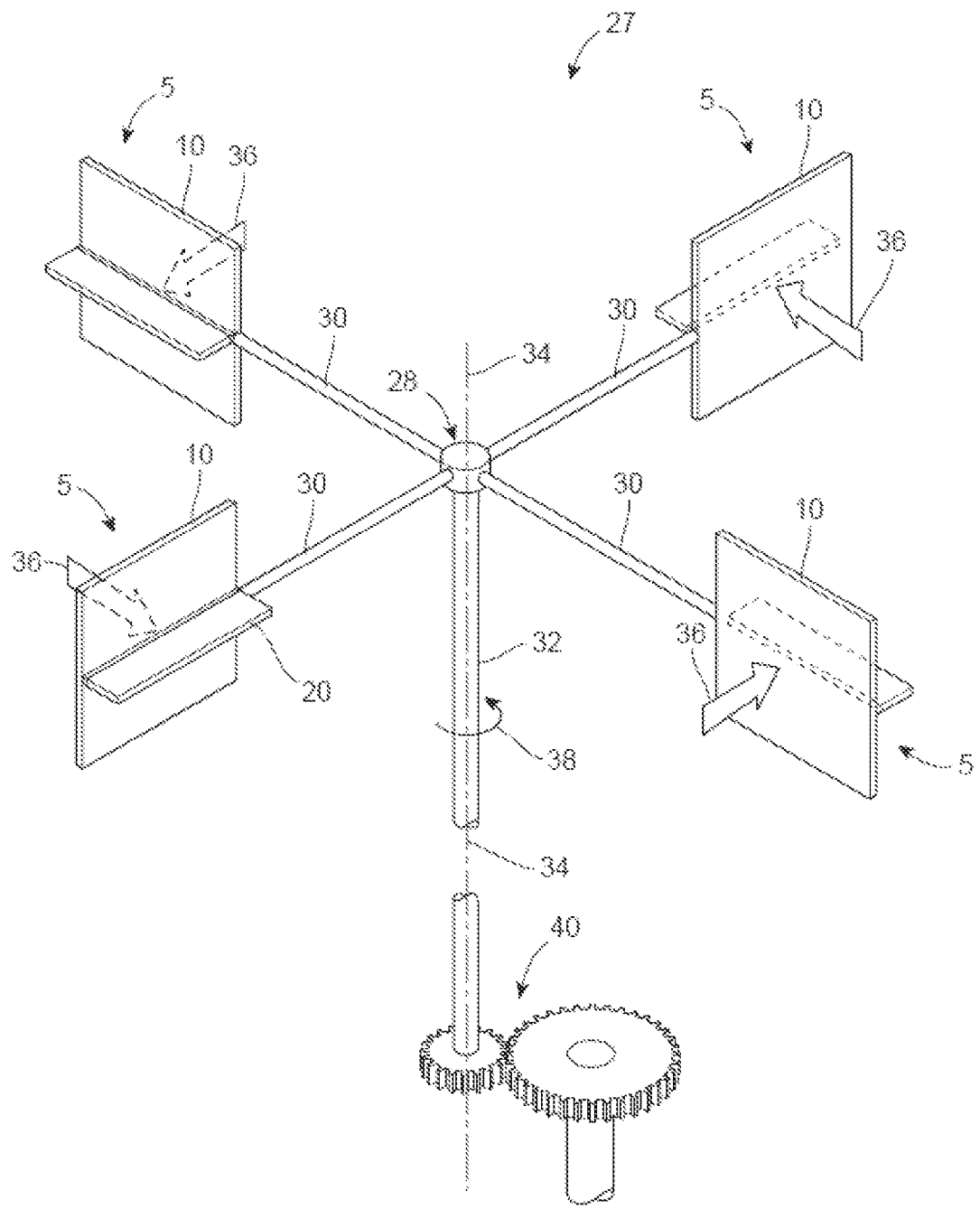
FIG. 3 is a perspective view of a sonic motor having multiple sonic thrust elements disposed on a rotor to produce useful kinetic energy.

FIG. 3 illustrates a motor 27 (referred to herein as a sonic motor) which can harness the thrust on the flat plate 10 of FIG. 1 to produce useful kinetic energy. In particular, the motor 27 of FIG. 3 includes a rotor 28 having, in this case, four lever arms 30 rigidly connected to and disposed around a center bar 32. The bar 32 rotates about a longitudinal axis 34 which defines an axis of rotation for the rotor 28. As illustrated in FIG. 3, thrust elements 5 (described with respect to FIG. 1) are disposed on the ends of the lever arms 30 so that the plates 10 of the thrust elements 5 are disposed extending out from the lever arms 30 in an essentially radial plane with respect to the axis of rotation 34 and/or so that a normal to the surface of the plane of each of the flat plates 10 is disposed in an essentially tangential direction with respect to a circle disposed in a plane perpendicular to the axis of rotation 34 and having a center point on the axis of rotation 34.

While the oscillators 20 of the thrust elements 5 are illustrated as being disposed to extend radially out from the axis of rotation 34, the thrust elements 5 could be rotated so that the acoustic oscillators 20 extend in any other direction with respect to the axis of rotation 34. Thus, for example, instead of being disposed horizontally across the plates 10 from side to side, as illustrated in FIG. 3, the oscillators 20 could be disposed vertically across the plates 10 (from top to bottom), or an any diagonal direction across the plates 10. Still further, while each of the oscillators 20 is illustrated as being disposed across a center of one of the flat plates 10, the oscillator 20 of the thrust elements 5 could be disposed, instead, off-center with respect to an associated flat plate 10, and even at the edge of the flat plate 10, if so desired, as long as the oscillator 20 directs sound waves across the top surface 12 of the associated flat plate 10. Moreover, while the flat plates 10 are illustrated as essentially square plates, the plates 10 could be other shapes as well, such as rectangular, circular, oval, etc. Also, while the surface 14 of the flat plates 10 is illustrated as being flat, this condition may not be necessary, and other surface contours could be used as well. Likewise, while four sonic thrust elements 5 are shown in FIG. 3 as being connected to the center bar 32 via lever arms 30, any other number of thrust elements 5, such as one, two, three, five, etc. could be used instead.

In the structure of FIG. 3, operation (energization) of the oscillators 20 causes thrust on the flat plates 10, which thrust is illustrated by the arrows 36 in FIG. 3. The thrust 36 on the flat plates 10 places a torque on the lever arms 30 proportional to the lengths of the arms 30, and imparts a rotational thrust 38 onto the bar 32 around the axis of rotation 34. The bar 32 may be allowed to rotate and, if desired, may be connected to a gearing mechanism 40 which can be used to harness the rotational kinetic energy imparted to the bar 32 by the sonic thrust elements 5. If desired, this kinetic energy may be converted to electrical energy with the use of a generator (not shown in FIG. 3). In such an embodiment, the rotor 28 may have an electromagnetic field element which creates a rotating electromagnetic field with respect to (e.g., inside of or around) a stator, which may generate electricity in the stator. As generators are well known, they will not be described in more detail herein.

Generally speaking, the operation of the sonic thrust elements 5 of FIGS. 1, 2 and 3 can be more completely understood on the basis of an analogy to the force imparted to an airplane wing moving with subsonic speed through the air (an ambient fluid). In this case, the shape of the wing causes the pressure above the wing to be less than the pressure below the wing as the wing moves through the air, in the manner predicted by Bernoulli's law, which in turn causes lift on the wing. In the case of the structures of FIGS. 1, 2 and 3, the airplane wing is replaced by a plate 10 having an acoustic oscillator disposed on one side of the plate 10. The sound waves generated by the oscillators 20 mimic air flowing at the speed of sound over the surface of the plate 10. According to Bernoulli's law, the pressure on the surface of the plate 10 over which the sound waves are traveling will be less than the pressure on the opposite side of the plate 10. Based on the time dependent version of Bernoulli's law, a thrust on the plate 10 results. However, in order for this thrust to occur as a result of the sound waves produced by the oscillator 20, a number of conditions must be satisfied based on the mathematical derivations of the physical principles occurring in this system.

To begin with, a number of basic variables used in the equations below are defined as:

L is the length of the plate (10);
S is the width of the plate (10);
H is the height of the oscillator (20), from the bottom of the oscillator near the plate surface (12) to the top of the oscillator;
$\epsilon$ is the distance from the bottom of the oscillator to the top of the plate;
$\alpha$ is the length of the rotation arm, defined as the distance between the axis of rotation (34) and the center of mass of (a) the rotating arm (30) plus (b) the plate plus (c) the oscillator; and C is the speed of sound in the ambient fluid.

First the wattage output of an acoustic oscillator can be expressed as:

$$W(\text{watts}) = \Omega = \frac{256\,\pi^3 \delta S H A^3}{2^{\frac{5}{2}}} \frac{1}{\text{cm}^6} \qquad \text{Eq. (1)}$$

wherein:
W is the output of the oscillator in watts;
$\delta$ is the mass density of the ambient fluid;
H is the height of the oscillating diaphragm;
S is the width of the oscillating diaphragm (also the width of the plate); and
A is the amplitude of the oscillation measured in cm/s.

It is well known that a watt is:
Watt=$10^7$ dyn-cm/s=$10^7$ g-cm$^2$/s$^3$

Next, the formula for the optimal thrust (T) on a flat plate due to an acoustic source acting as a catalyst, such as that illustrated in FIG. 1, can be expressed as:

$$T = \frac{\pi \delta A^2 \cos^2(2\pi ft)}{\varepsilon^2} + \frac{8\pi \delta S \sqrt{\frac{LS}{\pi}}\, HA(2\pi f)\sin(2\pi ft)}{\text{cm}^2} \qquad \text{Eq. (2)}$$

wherein:
f is the frequency of the sound waves created by the oscillator in hertz;
t is the time in seconds;
$\epsilon$ is the distance from the bottom of the oscillator to the top of the plate;
$\delta$ is the mass density of the ambient fluid.

However, for the system of FIG. 1 to operate, the thrust on the plate 10 must point in one direction only, that is, from the lower side 14 of the plate 10 to the upper side 12 of the plate 10 as illustrated in FIG. 1. To meet this condition, the second part of the expression on the right side of Eq. (2) must be able to be ignored (i.e., must be much less than the first part), which occurs when:

$$\frac{A}{32\sqrt{\pi}\, S^{\frac{3}{2}} HL^{\frac{1}{2}} \varepsilon^2}\,\text{cm}^2 \gg f \qquad \text{Eq. (3)}$$

wherein $\gg$ means at least a magnitude of 10 times greater than.

This formula was obtained using:

$$\langle \cos^2 2\pi ft \rangle = \frac{1}{2} \qquad \text{Eq. (4)}$$

wherein <quantity> means the average value of the quantity over one cycle and setting the sine term in the second part of the expression on the right side of Eq. (2) equal to 1.

Now, at optimal thrust conditions, the fluid pressure on the oscillator side of the plate is near a vacuum, and so, at this condition, the thrust T on the plate is:

$$T = PLS \qquad \text{Eq. (5)}$$

wherein:
T is the thrust on the plate;

P is the ambient fluid pressure on the non-oscillator side of the plate;
L is the length of the plate; and
S is the width of the plate.

Substituting Eq. (4) into Eq. (2) assuming that the constraint of Eq. (3) is satisfied gives:

$$T = \frac{\pi \delta A^2}{2\varepsilon^2} \qquad \text{Eq. (6)}$$

and equating the different expressions for the thrust T from Eqs. (6) and (5) gives:

$$T = \frac{\pi \delta A^2}{2\varepsilon^2} = PLS \qquad \text{Eq. (7)}$$

Expressing the right most equality of Eq. (7) as a function of $\varepsilon$ (the distance from the bottom of the oscillator to the top surface of the plate) gives:

$$\varepsilon = \frac{\sqrt{\pi/2}\, \delta^{\frac{1}{2}} A}{P^{\frac{1}{2}} L^{\frac{1}{2}} S^{\frac{1}{2}}} \qquad \text{Eq. (8)}$$

Now, the torque G produced by a single plate in a rotor system such as that of FIG. 3 at the optimal thrust conditions is expressed as:

$$G = PLS\alpha = \frac{\pi \delta A^2 \alpha}{2\varepsilon^2} \qquad \text{Eq. (9)}$$

From the discussion above, Eqs. (3) and (8) are constraints that must be satisfied when operating the system, wherein Eq. (3) guarantees that the thrust on the plate is always directed from the side of the plate opposite the acoustic oscillator towards the side of the plate with the acoustic oscillator and Eq. (8) is a condition for optimal thrust.

Of course, there is a physical limit to how close the oscillator 20 can be placed to the side 12 of the plate 10, and thus there is a physical limit to how small $\varepsilon$ can be made. A reasonable choice for minimal possible value of $\varepsilon$ is believed to be about $3 \times 10^{-6}$ cm (i.e., 300 angstroms) as films of plastics such as collodion can be manufactured at this thickness to be used as windows for low pressure gas retention. Substituting this value for $\varepsilon$ into Eq. (8) gives:

$$\frac{\pi \delta A^2}{2PLS} \geq 9 \times 10^{-12} \text{cm}^2 \qquad \text{Eq. (10)}$$

Next, in order to justify neglecting the viscosity terms in the Navier-Stokes equations for the ambient fluid, the following constraint is also determined:

$$\frac{3\delta C^3}{8\pi^2 \mu H} \gg f^2 \qquad \text{Eq. (11)}$$

wherein:
C is the speed of sound in the ambient fluid; and
$\mu$ is the absolute viscosity of the ambient fluid.

Substituting the ideal gas law ($P=\rho RT_{emp}$) into Eq. (8) gives:

$$\varepsilon = \frac{\sqrt{\pi/2}\, \delta^{\frac{1}{2}} A}{\rho^{\frac{1}{2}} R^{\frac{1}{2}} T_{emp}^{\frac{1}{2}} L^{\frac{1}{2}} S^{\frac{1}{2}}} \qquad \text{Eq. (12)}$$

wherein:
$\rho$ is the weight density of the gas;
R is the gas constant; and
$T_{emp}$ is temperature.

Eq. (12) relates the optimal thrust to the temperature of the gas (ambient fluid). As can be seen, as the density of the gas varies, $\delta/\rho$ remains constant, meaning that there is a direct dependence of $\varepsilon$ on the temperature $T_{emp}$ and thus that the energy which produces the thrust in this system comes from the heat in the ambient fluid.

A final constraint that must be satisfied is:

$$f \gg \frac{C}{\sqrt{\pi LS}} \qquad \text{Eq. (13)}$$

This constraint assures that the wavelength of the sound waves are small compared to the dimensions of the plate, so that the sound waves behave like particles traveling near the speed of sound (thereby justifying the airplane wing analogy).

Now, it is possible to describe the thrust on the plate in terms of the wattage output of the oscillator as:

$$T = \frac{581.7\, \Omega^{\frac{2}{3}} \delta^{\frac{1}{3}}}{\varepsilon^2 S^{\frac{2}{3}} H^{\frac{2}{3}}} \frac{g^{\frac{2}{3}} \text{cm}^{\frac{16}{3}}}{s^2} \qquad \text{Eq. (14)}$$

Thus, expressed in terms of the wattage output of the oscillator from Eq. (14), the constraints which must be satisfied to obtain optimal thrust on the plate using sound waves are:

Constraint 1

$$\frac{5.833 \times 10^{-4} PL^{\frac{1}{2}}}{\delta^{\frac{2}{3}} S^{\frac{1}{6}} H^{\frac{2}{3}} \Omega^{\frac{1}{3}}} \frac{s}{g^{\frac{1}{3}} \text{cm}^{\frac{2}{3}}} \gg f \qquad \text{(C1)}$$

This constraint is derived by solving the right most equality of Eq. (1) for A and substituting this expression of A into Eq. (3).

Constraint 2

$$\varepsilon = \frac{24.12\, \Omega^{\frac{1}{3}} \delta^{\frac{1}{6}}}{P^{\frac{1}{2}} L^{\frac{1}{2}} S^{\frac{5}{6}} H^{\frac{1}{3}}} \frac{g^{\frac{1}{3}} \text{cm}^{\frac{8}{3}}}{s} \qquad \text{(C2)}$$

This constraint is derived by solving the right most equality of Eq. (1) for A and substituting this expression of A into Eq. (8).

Constraint 3:

$$\varepsilon \geq 3 \times 10^{-6} \text{cm} \qquad \text{(C3)}$$

Assumption based on reasonable expectation of physical limits

Constraint 4

$$\frac{5.817 \, \Omega^{\frac{2}{3}} \delta^{\frac{1}{3}}}{PLS^{\frac{5}{3}} H^{\frac{2}{3}}} \frac{g^{\frac{2}{3}} cm^{\frac{16}{3}}}{s^2} \geq 9 \times 10^{-14} cm^2 \quad (C4)$$

This constraint is determined by plugging the $\epsilon$ value of C2 into C3.

Constraint 5

$$\frac{3.80 \times 10^{-2} \delta C^3}{\mu H} \gg f^2 \quad (C5)$$

The constraint of Eq. (11).

Constraint 6

$$f \gg \frac{0.564 \, C}{L^{\frac{1}{2}} S^{\frac{1}{2}}} \quad (C6)$$

The constraint of Eq. (13).

Now, assuming that the physical parameters (L, S, H, $\epsilon$, f, etc.) can be chosen such that these conditions (C1-C6) can be met, the rotational torque G that will be produced by a single plate element (i.e., a single sonic thrust element 5 of FIG. 1) attached to an arm is:

$$G = \frac{581.7 \, \Omega^{\frac{2}{3}} \delta^{\frac{1}{3}} \alpha}{\epsilon^2 S^{\frac{2}{3}} H^{\frac{2}{3}}} \frac{g^{\frac{2}{3}} cm^{\frac{16}{3}}}{s^2} = PLS\alpha \quad \text{Eq. (15)}$$

This equation is derived by solving the right most equality of Eq. (1) for A and substituting this expression of A into Eq. (9).

From Eq. (15), the power output (PO) of the rotating plate system with a single plate or thrust element is:

$$PO = \frac{.1047 \, (\#R_m)\alpha PLS}{s} = 2\pi R_{ps} G \quad \text{Eq. (16)}$$

wherein:

$R_{ps}$ is the number of revolutions of the arm per second; and
$\#R_m$ is the number of revolutions of the arm in one minute such that $R_{ps} = \#R_m/60$ s.

COMPUTATIONAL EXAMPLE

An explicit example of the parameters of the system described above is provided below illustrating that all of the constraints (C1-C6) can be simultaneously satisfied. In this example, the ambient fluid is taken to be air at 69 deg F. at standard atmospheric pressure. As such, and as is known for this condition:

$\mu=0.00018$ g/cm-s (the absolute viscosity of air).

$P=1.013 \times 10^6$ g/cm-$s^2$ (the ambient air pressure).

$\rho=1.1781$ g/$cm^2$-$s^2$ (the weight density of ambient air).

$\delta=1.2013 \times 10^{-3}$ g/$cm^3$ (the mass density of ambient air).

$C=33162$ cm/s (the speed of sound in ambient air).

The dimensions of the plate and the oscillating diaphragm in this example are taken to be:

$L=60$ cm $S=10$ cm $H=5$ cm.

Moreover, $\alpha=60$ cm (the length of the rotation arm);

$\Omega=0.25$ watts (the output wattage of the acoustic oscillator); and $f=16000$ hertz=16000/s (the frequency of oscillation of the oscillator).

For this example, it will be assumed that the acoustic oscillator is ¼ percent efficient, which is a reasonable assumption, and that the input wattage to the oscillator is 100 watts, which is reasonably attainable with common acoustic speakers.

Substituting these values into the constraints (C1-C6) and solving for these equations provides the following expressions.

| | |
|---|---|
| $1.625 \times 10^5$/s $\gg$ 16000/s | C1: |
| $\epsilon = 5.454 \times 10^{-5}$ cm | C2: |
| $5.454 \times 10^{-5}$ cm $\geq 3 \times 10^{-6}$ cm | C3: |
| $2.975 \times 10^{-11}$ cm $\geq 9 \times 10^{-14}$ cm | C4: |
| $9.25 \times 10^{12}$/$s^2 \gg 2.56 \times 10^8$/$s^2$ | C5: |
| $1.6 \times 10^4$/s $\gg 7.636 \times 10^2$/s | C6: |

Thus, all of the constraints defined by C1-C6 are satisfied, and the system manufactured and operated with these conditions will therefore operate as described. Of course, many other choices of the variables L, S, H, $\alpha$, and f will work as well, and the operation of the system described herein is certainly not limited to the specific computational example described herein.

The described system does not violate the principles of the conversation of energy, and the underlying operation of the system instead, is consistent with the principle of conservation of energy as the energy comes from the heat in the ambient fluid. Generally speaking, the sonic thrust element described herein produces a low pressure region on the side of the plate where the oscillator is located while keeping standard atmospheric pressure on the other side of the plate. By restricting the wavelength of the sound waves to be small compared to the dimensions of the plate, the sound waves behave like particles moving at nearly the speed of sound. The analogy with the flow of air across an airplane wing is thus very strong and Bernoulli's law in fact predicts a thrust that is close to that of standard atmospheric pressure against a vacuum The pressure differences are directly related to temperature differences, and hence to energy differences. Stated another way, Bernoulli's law, which predicts the pressure difference on the opposite sides of the plate, combined with the ideal gas law, which predicts a temperature change with pressure change, means that the heat energy in the air is converted into the kinetic energy in the moving plate and lever arm device. Thus, the sound waves are not converted into to kinetic energy directly, but serve as a catalyst for converting heat energy in the ambient fluid (e.g., air) into kinetic energy.

It is possible to modify the sonic thrust element 5 of FIG. 1 to reduce or eliminate the need to account for the finite distance ε between the bottom of the oscillator 20 and the top of the plate 10 in the equations above. In particular, the oscillator 20 can be disposed partially down within the plate 10 to assure sound waves emanate from the oscillator 20 at the same level as the top surface 12 of the flat plate 10, so that there is no distance between the "bottom of the oscillator" and the top of the flat plate 10.

Figure 4:
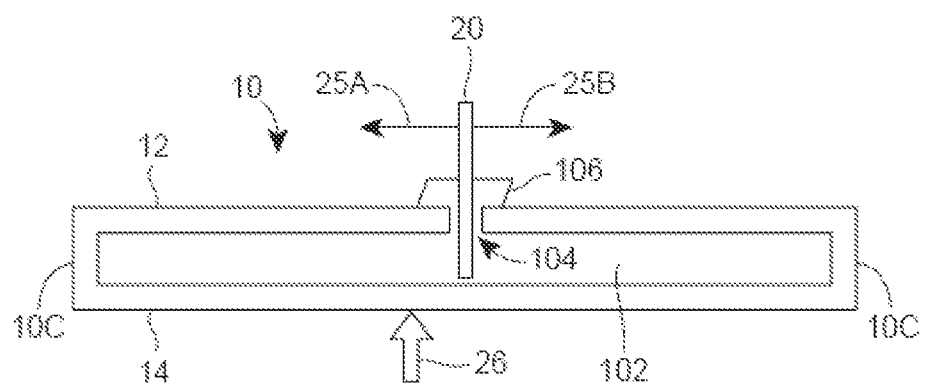
FIG. 4 is a cross-sectional, side view of a second embodiment of a sonic thrust element which uses sonic energy to produce thrust on a barrier element in the form of a flat plate.

FIG. 4 illustrates one example of such a configuration. Here, the plate 10 is illustrated as including a top portion 10A and a bottom portion 10B connected by side portions 10C forming a hollow section 102 between the top and bottom portions 10A and 10B of the plate 10. The oscillator 20 extends from above the top portion 10A of the plate 10 down into the hollow section 102 of the plate 10 through a hole or slit 104 such that the bottom of the oscillator 20 is at the same level as or below the top surface 12 of the top portion 10A of the plate 10. A control mechanism 106 is illustrated diagrammatically in FIG. 4 as being attached to the oscillator 20 to operate the oscillator 20 to produce sound waves of, for example, a constant frequency as defined by the constraints described herein. The mechanism 106 may be electrical or mechanical in nature using any standard oscillator technology. Moreover, if desired, the control mechanism 106 may be at least partially disposed within the hollow section 102 of the plate 10.

Using the sonic thrust element illustrated in FIG. 4 eliminates the need for Eq. (12) and the constraints (C2) (C3) and (C4) given above for the sonic thrust element 5 of FIG. 1. This configuration is thus left with a smaller set of constraints given as:

$$\frac{5.833 \times 10^{-4} P L^{\frac{1}{2}}}{\delta^{\frac{2}{3}} S^{\frac{1}{6}} H^{\frac{2}{3}} \Omega^{\frac{1}{3}}} \frac{s}{g^{\frac{1}{3}} cm^{\frac{2}{3}}} \gg f \quad (C1')$$

$$\frac{3.80 \times 10^{-2} \delta C^3}{\mu H} \gg f^2 \quad (C2')$$

$$f \gg \frac{0.564 \, C}{L^{\frac{1}{2}} S^{\frac{1}{2}}} \quad (C3')$$

As before, for a single arm rotational device using the thrust element of FIG. 3:

$$G = \alpha P L S$$

and $$PO = \frac{.1047 \times (\#R_m) \alpha P L S}{s}.$$

Again, if the ambient fluid is taken to be air at 69 deg F. at standard atmospheric pressure, then:

μ=0.00018 g/cm-s (the absolute viscosity of air).

$P$=1.013×10$^6$ g/cm-s$^2$ (the ambient air pressure).

ρ=1.1781 g/cm$^2$-s$^2$ (the weight density of ambient air).

δ=1.2013×10$^{-3}$ g/cm$^3$ (the mass density of ambient air).

$C$=33162 cm/s (the speed of sound in ambient air).

Plugging these values into the constraints (C1'), (C2') and (C3') gives the specific constraints:

$$\frac{5.229 \times 10^4 L^{\frac{1}{2}}}{S^{\frac{1}{6}} H^{\frac{2}{3}} \Omega^{\frac{1}{3}}} \frac{cm^{\frac{1}{3}}}{s} \gg f \quad (C1')$$

$$\frac{9.249 \times 10^{12}}{H} \frac{cm}{s^2} \gg f^2 \quad (C2')$$

$$f \gg \frac{1.870 \times 10^4}{L^{\frac{1}{2}} S^{\frac{1}{2}}} \frac{cm}{s} \quad (C3')$$

and $$PO = \frac{1.0606 \times 10^5 \, (\#R_m) \alpha L S g}{cm \, s^3}.$$

A number of examples using this configuration will now be provided, it being understood that other example configuration parameters can be used as well or instead.

Example 1

α=1000 cm $L$=100 cm $S$=100 cm $H$=10 cm $\#R_m$=100

Ω=1 watt.

In this example, the constraints (C1')-(C3') become:

$$\frac{5.229 \times 10^4}{s} \gg f$$

$$\frac{9.249 \times 10^{11}}{s^2} \gg f^2$$

$$f \gg \frac{1.870 \times 10^2}{s}$$

and these constraints may be consistently satisfied for f=2×10$^3$ hertz.

Example 2

α=100 cm $L$=20 cm $S$=5 cm $H$=1 cm $\#R_m$=100

Ω=0.25 watt.

In this example, the constraints (C1')-(C3') become:

$$\frac{2.253 \times 10^5}{s} \gg f$$

$$\frac{9.249 \times 10^{12}}{s^2} \gg f^2$$

$$f \gg \frac{1.870 \times 10^3}{s}$$

and these constraints may be consistently satisfied for $f=2\times 10^4$ hertz.

Example 3

$\alpha = 5$ cm $L = 2.5$ cm $S = 2$ cm $H = 0.5$ cm $\#R_m = 40$ $\Omega = 0.001$ watt.

In this example, the constraints (C1')-(C3') become:

$$\frac{1.169 \times 10^6}{s} \gg f$$

$$\frac{1.850 \times 10^{13}}{s^2} \gg f^2$$

$$f \gg \frac{8.364 \times 10^3}{s}$$

and these constraints may be consistently satisfied for $f=10^5$ hertz.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. An acoustic turbine comprising:
   a rotor having an axis of rotation; and
   at least one lever arm coupled to the rotor and extending away from the rotor, the lever arm including a thrust element disposed on the lever arm, the thrust element comprising:
      a barrier element including a first outer surface and a second outer surface;
      an acoustic oscillator disposed in close proximity to the first outer surface of the barrier element; and
      a drive mechanism for driving the acoustic oscillator to produce sound waves flowing along the first outer surface to create a pressure differential between the first outer surface and the second outer surface such that the pressure on the first outer surface is less than the pressure on the second outer surface and thereby to create a thrust on the second outer surface towards the first outer surface, the thrust having a component that is orthogonal to the axis of rotation to rotate the rotor.

2. The acoustic turbine of claim 1, wherein the at least one lever arm comprises two lever arms coupled to the rotor and extending from the rotor in opposite directions.

3. The acoustic turbine of claim 1, wherein the barrier element is a flat plate and wherein the first outer surface is substantially parallel to the second outer surface.

4. The acoustic turbine of claim 1, wherein the drive mechanism drives the acoustic oscillator to produce sound waves having a substantially constant frequency.

5. The acoustic turbine of claim 4, wherein the substantially constant frequency (f) is constrained by:

$$f \ll \frac{A}{32\sqrt{\pi}\, S^{\frac{3}{2}} H L^{\frac{1}{2}} \varepsilon^2}\, cm^2,$$

$$f^2 \ll \frac{3\delta C^3}{8\pi^2 \mu H},$$

and $$f \gg \frac{C}{\sqrt{\pi L S}},$$

wherein A is the amplitude of oscillation, S is a width of the acoustic oscillator, H is a height of the acoustic oscillator, L is a length of the acoustic oscillator, $\epsilon$ is a distance between a surface of the acoustic oscillator and the first outer surface of the barrier element, $\delta$ is a mass density of ambient fluid, C is the speed of sound in ambient fluid, $\mu$ is absolute viscosity of ambient fluid, $\ll$ indicates at least a magnitude of ten times less than and $\gg$ indicates at least a magnitude of ten times greater than.

* * * * *